US012791790B2

(12) United States Patent
Liang et al.

(10) Patent No.: US 12,791,790 B2
(45) Date of Patent: Nov. 10, 2026

(54) PHOTONIC DEVICE, CROSSED WAVEGUIDE, WAVEGUIDE LAYER AND METHOD FOR MANUFACTURING SAME

(71) Applicant: NANJING LYCORE TECHNOLOGIES CO., LTD, Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN)

(73) Assignee: NANJING LYCORE TECHNOLOGIES CO., LTD, Nanjing (CN)

( * ) Notice: Subject to any disclaimer, the term of this patent is extended or adjusted under 35 U.S.C. 154(b) by 305 days.

(21) Appl. No.: 18/516,998

(22) Filed: Nov. 22, 2023

(65) Prior Publication Data

US 2024/0085625 A1 Mar. 14, 2024

Related U.S. Application Data

(63) Continuation of application No. PCT/CN2022/081789, filed on Mar. 18, 2022.

(30) Foreign Application Priority Data

May 24, 2021 (CN) ......................... 202110568168.2
May 24, 2021 (CN) ......................... 202121127053.1

(51) Int. Cl.
*G02B 6/125* (2006.01)
*G02B 6/136* (2006.01)

(52) U.S. Cl.
CPC ............. *G02B 6/125* (2013.01); *G02B 6/136* (2013.01)

(58) Field of Classification Search
CPC ................................ G02B 6/125; G02B 6/136
See application file for complete search history.

(56) References Cited

U.S. PATENT DOCUMENTS

2005/0213912 A1* 9/2005 Aalto ................... G02B 6/1228
385/39
2016/0327751 A1* 11/2016 Wu ........................ G02B 6/355
2021/0311336 A1* 10/2021 Kharel .................. G02F 1/0356

FOREIGN PATENT DOCUMENTS

CN 101248379 A 8/2008
CN 103513333 A 1/2014
JP 59176731 A * 10/1984 ........... G02F 1/3137

OTHER PUBLICATIONS

Luo et al.; "Low-loss low-crosstalk silicon rib waveguide crossing with tapered multimode-interference design", Group IV Photonics (GFP), 2012 IEEE 9th International Conference on, IEEE, Aug. 29, 2012 (Aug. 29, 2012), pp. 150-152. (Year: 2012).*

(Continued)

*Primary Examiner* — Michael P Mooney

(57) ABSTRACT

The application discloses a photonic device, a crossed waveguide, a waveguide layer and a method for manufacturing the same.

9 Claims, 3 Drawing Sheets

(56) References Cited

OTHER PUBLICATIONS

International Search Report of PCT Patent Application No. PCT/CN2022/081789 issued on May 26, 2022.
Susan M. Lindecrantz et al., Estimation of Propagation Losses for Narrow Strip and Rib Waveguides, IEEE Photonics Technology Letters, Sep. 15, 2014, pp. 1836-1839, vol. 26, No. 18.
L. Vivien et al., Comparison between strip and rib SOI microwaveguides for intra-chip light distribution, Optical Materials, 2005, pp. 756-762, vol. 27.

* cited by examiner

PHOTONIC DEVICE, CROSSED WAVEGUIDE, WAVEGUIDE LAYER AND METHOD FOR MANUFACTURING SAME

CROSS-REFERENCE TO RELATED APPLICATIONS

This application is a continuation of International Application No. PCT/CN2022/081789, filed on Mar. 18, 2022, which claims priority to Chinese Patent Application No. 202110568168.2, filed to the China National Intellectual Property Administration on May 24, 2021 and entitled "Photonic Device, Crossed Waveguide and Waveguide Layer thereof", and claims priority to Chinese Patent Application No. 202121127053.1, filed to the China National Intellectual Property Administration on May 24, 2021 and entitled "Photonic Device, Crossed Waveguide and Waveguide Layer thereof". All of the aforementioned applications are incorporated herein by reference in their entireties.

TECHNICAL FIELD

The application relates to the technical field of optical waveguides, and in particular, to a photonic device, a cross waveguide, a waveguide layer and a method for manufacturing the same.

BACKGROUND

Ridged waveguides are increasingly used in photonic devices, and have lower transmission loss than rectangular waveguides. Moreover, in some special applications, the ridged waveguides have much better performance than the rectangular waveguides. For example, in a lithium niobate modulator, the ridged waveguide can better make an electric field formed between two electrodes accumulate inside a waveguide material and pass through the waveguide, thereby greatly enhancing the interaction between the material and the electric field generated by the electrodes. However, in related technology, during the transmission of light in the rectangular waveguide, the energy is concentrated on the rectangular waveguide, resulting in fast loss of the rectangular waveguide.

For the problem of fast loss of the rectangular waveguides in the related technology, no effective technical solution has been proposed.

SUMMARY

A main objective of the application is to provide a photonic device, a crossed waveguide, a waveguide layer and a method for manufacturing the same to solve the problem of fast loss of rectangular waveguides in related technology.

In order to achieve the above objective, the application provides a waveguide layer.

According to the application, the waveguide layer includes a flat plate sublayer, a first waveguide and a second waveguide intersected with the first waveguide. The first waveguide and the second waveguide are both ridged waveguides.

The first waveguide and the second waveguide are arranged on the flat plate sublayer, and the flat plate sublayer, the first waveguide and the second waveguide are of an integrated structure.

Optionally, the first waveguide and the second waveguide are of the same structure.

Optionally, the first waveguide and the second waveguide are perpendicular to each other.

Optionally, the ridged waveguide includes a wide strip section, two transition sections and two narrow strip sections.

The two transition sections and the two narrow strip sections are symmetrical about the wide strip section, the transition section is located between the narrow strip section and the wide strip section, the cross-sectional width of the wide strip section is greater than that of the narrow strip section, the width of one side, connected to the narrow strip section, of the transition section is equal to the cross-sectional width of the narrow strip section, and the width of one side, connected to the wide strip section, of the transition section is equal to the cross-sectional width of the wide strip section.

Optionally, in a cross-section parallel to the flat plate sublayer, the shapes of the narrow strip section and the wide strip section are both rectangular, and the width of the transition section gradually increases from the narrow strip section to the wide strip section.

Optionally, an angle between an outer surface of a strip edge of the ridged waveguide and the flat plate sublayer is greater than 20 degrees and less than 90 degrees.

Optionally, both ends of the first waveguide and both ends of the second waveguide extend to an edge of the flat plate sublayer.

In a second respect, the application further provides a crossed waveguide, which includes an isolation layer, a substrate layer and the above waveguide layer. A refractive index of the isolation layer is lower than that of the waveguide layer.

Optionally, the crossed waveguide further includes a cover layer. The waveguide layer is arranged between the isolation layer and the cover layer, a refractive index of the cover layer is lower than that of the waveguide layer, and the first waveguide and the second waveguide are located between the flat plate sublayer and the cover layer.

In a third aspect, the application further provides a photonic device, which includes the above crossed waveguide.

In a fourth aspect, the application further provides a method for manufacturing a waveguide layer. The method includes the following operations.

A photoresist is spin-coated on a substrate.

Pattern exposure is performed on the substrate.

The substrate after pattern exposure is etched to expose a flat plate sublayer, and a first waveguide and a second waveguide which protrude from the flat plate sublayer, the first waveguide is intersected with the second waveguide, and the first waveguide and the second waveguide are both ridged waveguides.

The photoresist is removed from the first waveguide and the second waveguide.

Optionally, the first waveguide and the second waveguide are perpendicular to each other.

Optionally, the ridged waveguide includes a wide strip section, two transition sections and two narrow strip sections.

The two transition sections and the two narrow strip sections are symmetrical about the wide strip section, the transition section is located between the narrow strip section and the wide strip section, the cross-sectional width of the wide strip section is greater than that of the narrow strip section, the width of one side, connected to the narrow strip section, of the transition section is equal to the cross-sectional width of the narrow strip section, and the width of one side, connected to the wide strip section, of the transition section is equal to the cross-sectional width of the wide strip section.

Optionally, in a cross-section parallel to the flat plate sublayer, the shapes of the narrow strip section and the wide strip section are both rectangular, and the width of the transition section gradually increases from the narrow strip section to the wide strip section.

Optionally, an angle between an outer surface of a strip edge of the ridged waveguide and the flat plate sublayer is greater than 20 degrees and less than 90 degrees.

Optionally, both ends of the first waveguide and both ends of the second waveguide extend to an edge of the flat plate sublayer.

Optionally, the first waveguide and the second waveguide are of the same structure.

In embodiments of the application, the waveguide layer is provided by arranging the flat plate sublayer, the first waveguide and the second waveguide intersected with the first waveguide. The first waveguide and the second waveguide are both the ridged waveguides. The first waveguide and the second waveguide are arranged on the flat plate sublayer, and the flat plate sublayer, the first waveguide and the second waveguide are of an integrated structure. In this way, the flat plate sublayer is arranged under the first waveguide and the second waveguide intersected with the first waveguide, so that during the transmission of light in the waveguide layer, energy is mainly concentrated on the flat plate sublayer, and the loss is mainly on the flat plate sublayer. The first waveguide and the second waveguide are both the ridged waveguides, the loss of the ridged waveguides is smaller, and the size of the flat plate sublayer relative to ridge edge of the ridged waveguides is larger, so that the loss of the ridged waveguides is reduced. Therefore, the problem of fast loss of the rectangular waveguides in the related technology is solved.

BRIEF DESCRIPTION OF THE DRAWINGS

In order to more clearly illustrate the embodiments of the application or the technical solutions in the related art, the drawings used in the description of the embodiments or the related art will be briefly described below. It is apparent that the drawings described below are only some embodiments of the application. Other drawings may further be obtained by those of ordinary skill in the art according to these drawings without creative efforts.

DETAILED DESCRIPTION OF THE EMBODIMENTS

Figure 1:
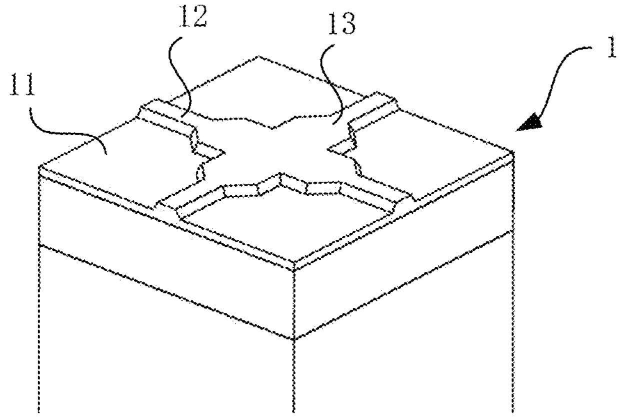
FIG. 1 is a schematic structural diagram of a waveguide layer according to an embodiment of the application.
Figure 2:
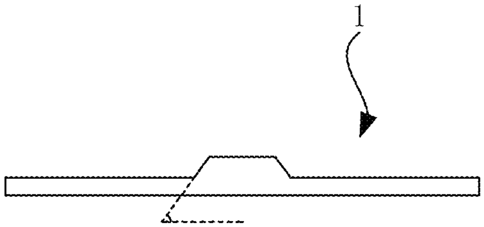
FIG. 2 is a schematic diagram of a cross-section of a waveguide layer according to an embodiment of the application.
Figure 3:
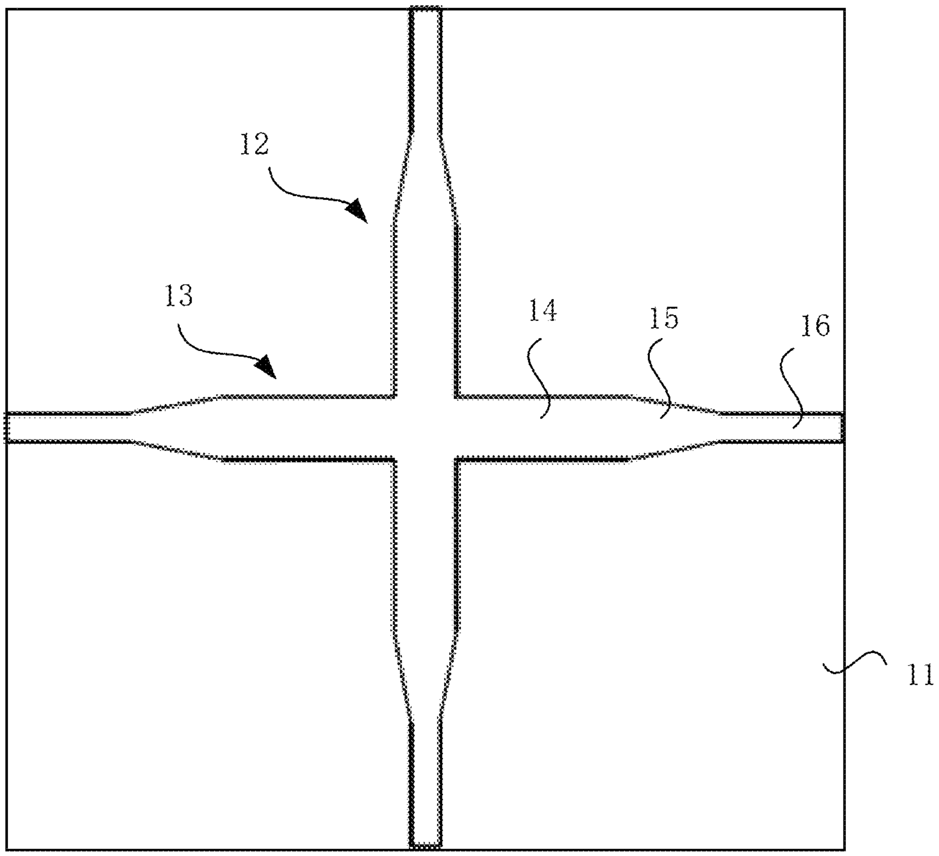
FIG. 3 is a top view of a waveguide layer according to an embodiment of the application.

The implementations of the application are further described in detail below in conjunction with the drawings and embodiments. The following embodiments are used to illustrate the application, but are not intended to limit the scope of the application.

It is to be noted that the terms "first", "second" and the like in the description, claims and the above-mentioned drawings of the application are used for distinguishing similar objects rather than describing a specific sequence or a precedence order. It should be understood that the data used in this way are interchangeable under appropriate circumstances to facilitate the embodiments described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In the application, the orientations or positional relationships indicated by the terms "upper", "down", "left", "right", "front", "rear", "top", "bottom", "inside", "outside", "center", "vertical", "horizontal", "transverse", "longitudinal", etc. are based on the orientations or positional relationships shown in the drawings. These terms are mainly for better describing the application and the embodiments thereof, and are not intended to limit that the apparatus, element or component indicated must have a specific orientation, or be constructed and operated in a specific orientation.

Moreover, some of the above terms may also be used to indicate other meanings in addition to orientations or positional relationships, for example, the term "upper" may also be used to indicate a certain attachment relationship or connection relationship in some cases. The specific meaning of these terms in the application may be understood by those of ordinary skill in the art in specific circumstances.

In addition, the terms "set", "have", "connect" shall be understood in a broad sense. For example, the "connect" may be fixedly connected or detachably connected, or an integrally connected; may be mechanically connected or electrically connected; and may be directly connected or indirectly connected through an intermediate medium, and may be the internal communication of two apparatuses, elements or components. The specific meaning of the above-mentioned terminology in the application may be understood by those of ordinary skill in the art in specific circumstances.

In addition, the meaning of the term "multiple" shall be two or more than two.

It is to be noted that the embodiments in the application and features in the embodiments may be combined with each other without conflict. The application is described in detail below with reference to the drawings and in conjunction with the embodiments.

For the problem of fast loss of rectangular waveguides in related technology, as shown in FIG. 1 to FIG. 6, the embodiments of the application provide a waveguide layer 1, which includes a flat plate sublayer 11, a first waveguide 12 and a second waveguide 13 intersected with the first waveguide 12. The first waveguide 12 and the second waveguide 13 are both ridged waveguides.

The first waveguide 12 and the second waveguide 13 are arranged on the flat plate sublayer 11, and the flat plate sublayer 11, the first waveguide 12 and the second waveguide 13 are of an integrated structure.

Figure 4:
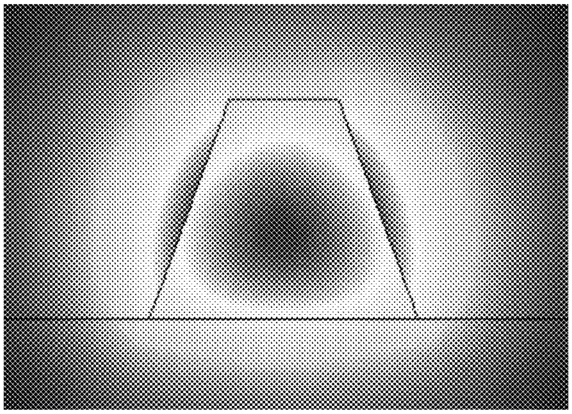
FIG. 4 is a schematic diagram of energy distribution of a crossed waveguide in related technology.
Figure 5:
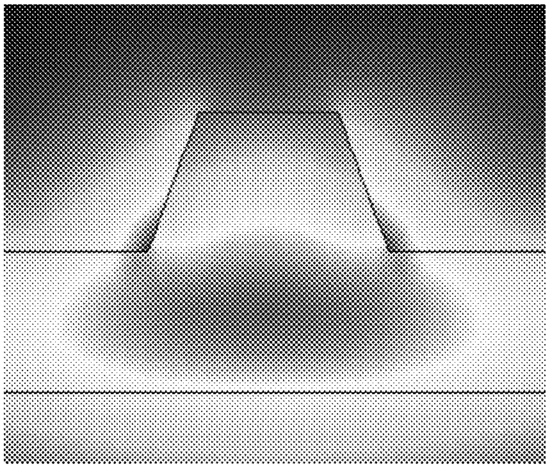
FIG. 5 is a schematic diagram of energy distribution of a waveguide layer according to an embodiment of the application.
Figure 6:
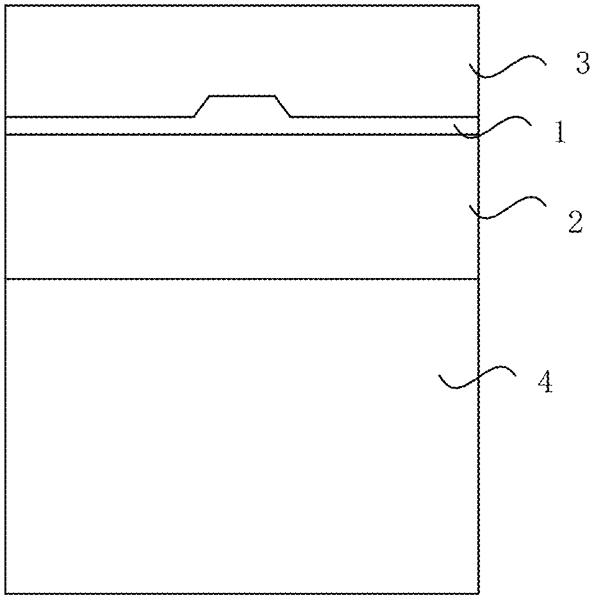
FIG. 6 is a schematic structural diagram of a crossed waveguide according to an embodiment of the application.

Specifically, in the related technology, as shown in FIG. 4, energy distribution of a crossed waveguide in the related technology is all concentrated on the rectangular waveguide, while in the embodiment, the flat plate sublayer 11 is arranged under the first waveguide 12 and the second waveguide 13 intersected with the first waveguide 12, and the flat plate sublayer 11, the first waveguide 12 and the second waveguide 13 are of an integrated structure, so that during the transmission of light in the waveguide layer 1, the energy is mainly concentrated on the flat plate sublayer 11, and as shown in FIG. 5, the loss is mainly on the flat plate sublayer 11. The first waveguide 12 and the second waveguide 13 are both the ridged waveguides, the loss of the ridged waveguides is smaller, and the size of the flat plate sublayer 11 relative to ridge edge of the ridged waveguides is larger, so that the loss of the ridged waveguides is reduced.

Optionally, the first waveguide 12 and the second waveguide 13 are of the same structure.

It is to be noted that the first waveguide 12 and the second waveguide 13 may be of different structures, and the specific sizes of the first waveguide 12 and the second waveguide 13 may be obtained according to finite element analysis in the related art.

Specifically, the first waveguide 12 and the second waveguide 13 are perpendicular to each other.

Specifically, the ridged waveguide includes a wide strip section 14, two transition sections 15 and two narrow strip sections 16.

The two transition sections 15 and the two narrow strip sections 16 are symmetrical about the wide strip section 14, the transition section 15 is located between the narrow strip section 16 and the wide strip section 14, the cross-sectional width of the wide strip section 14 is greater than that of the narrow strip section 16, the width of one side, connected to the narrow strip section 16, of the transition section 15 is equal to the cross-sectional width of the narrow strip section 16, and the width of one side, connected to the wide strip section 14, of the transition section 15 is equal to the cross-sectional width of the wide strip section 14.

Specifically, in a cross-section parallel to the flat plate sublayer 11, the shapes of the narrow strip section 16 and the wide strip section 14 are both rectangular, and the width of the transition section 15 gradually increases from the narrow strip section 16 to the wide strip section 14. The change in the width of the transition section 15 may be linear or nonlinear.

Optionally, an angle between an outer surface of a strip edge of the ridged waveguide and the flat plate sublayer 11 is greater than 20 degrees and less than 90 degrees.

Specifically, due to the angle formed between the strip edge of the ridged waveguide and the flat plate sublayer 11, the service life of the ridged waveguide is prolonged on the basis of increasing the size of the ridged waveguide, the ridged waveguide is more resistant to loss, and the energy is more concentrated on the flat plate sublayer 11 during the transmission of the light in the waveguide layer 1.

Specifically, both ends of the first waveguide 12 and both ends of the second waveguide 13 extend to an edge of the flat plate sublayer 11.

Based on the same technical concept, the application further provides a crossed waveguide, which includes an isolation layer 2, a substrate layer 4 and the above waveguide layer 1. The isolation layer 2 is arranged between the substrate layer 4 and the waveguide layer 1, and a refractive index of the isolation layer 2 is lower than that of the waveguide layer 1.

Optionally, the crossed waveguide further includes a cover layer 3. The waveguide layer 1 is arranged between the isolation layer 2 and the cover layer 3, a refractive index of the cover layer 3 is lower than that of the waveguide layer 1, and the first waveguide 12 and the second waveguide 13 are located between the flat plate sublayer 11 and the cover layer 3.

The refractive index of the isolation layer 2 and the refractive index of the cover layer 3 are both lower than that of the waveguide layer 1, so that during the transmission of light in the waveguide layer 1, the light may not pass through the isolation layer 2 and the cover layer 3, nor enter the substrate layer 4. The cover layer 3 may also play a role in the physical protection of the waveguide layer 1.

Based on the same technical concept, the application further provides a photonic device, which includes the above crossed waveguide.

Based on the same technical concept, the application further provides a method for manufacturing a waveguide layer 1. The method includes the following operations.

A photoresist is spin-coated on a substrate.

Pattern exposure is performed on the substrate.

The substrate after pattern exposure is etched to expose a flat plate sublayer 11, and a first waveguide 12 and a second waveguide 13 which protrude from the flat plate sublayer 11, the first waveguide 12 is intersected with the second waveguide 13, and the first waveguide 12 and the second waveguide 13 are both ridged waveguides.

The photoresist is removed from the first waveguide 12 and the second waveguide 13.

Specifically, the photoresist is first spin-coated on the substrate, and then pattern exposure is performed on the substrate by using a lithography machine and a mask, that is, a pattern corresponding to the first waveguide 12 and the second waveguide 13 is formed. Then, an Inductively Coupled Plasma (ICP) etching machine is used to etch the substrate after pattern exposure, so as to form the flat plate sublayer 11, the first waveguide 12 and the second waveguide 13 intersected with the first waveguide 12, and the photoresist is removed to manufacture the waveguide layer 1.

Optionally, the first waveguide 12 and the second waveguide 13 are of the same structure.

Specifically, the first waveguide 12 and the second waveguide 13 are perpendicular to each other.

Specifically, the ridged waveguide includes a wide strip section 14, two transition sections 15 and two narrow strip sections 16.

The two transition sections 15 and the two narrow strip sections 16 are symmetrical about the wide strip section 14, the transition section 15 is located between the narrow strip section 16 and the wide strip section 14, the cross-sectional width of the wide strip section 14 is greater than that of the narrow strip section 16, the width of one side, connected to the narrow strip section 16, of the transition section 15 is equal to the cross-sectional width of the narrow strip section 16, and the width of one side, connected to the wide strip section 14, of the transition section 15 is equal to the cross-sectional width of the wide strip section 14.

Specifically, in a cross-section parallel to the flat plate sublayer 11, the shapes of the narrow strip section 16 and the wide strip section 14 are both rectangular, and the width of the transition section 15 gradually increases from the narrow strip section 16 to the wide strip section 14.

Optionally, an angle between an outer surface of a strip edge of the ridged waveguide and the flat plate sublayer 11 is greater than 20 degrees and less than 90 degrees.

Specifically, both ends of the first waveguide 12 and both ends of the second waveguide 13 extend to an edge of the flat plate sublayer 11.

In the embodiments of the application, the waveguide layer 1 is provided by arranging the flat plate sublayer 11, the first waveguide 12 and the second waveguide 13 intersected with the first waveguide 12. The first waveguide 12 and the second waveguide 13 are arranged on the flat plate sublayer 11, and the flat plate sublayer 11, the first waveguide 12 and the second waveguide 13 are of an integrated structure. In this way, the flat plate sublayer 11 is arranged under the first waveguide 12 and the second waveguide 13 intersected with the first waveguide, so that during the transmission of light in the waveguide layer 1, energy is mainly concentrated on the flat plate sublayer 11, and the loss is mainly on the flat plate sublayer 11. The first waveguide 12 and the second waveguide 13 are both the ridged waveguides, the loss of the ridged waveguides is smaller, and the size of the flat plate sublayer 11 relative to ridge edge of the ridged waveguides is larger, so that the loss of the ridged waveguides is reduced. Therefore, the problem of fast loss of the rectangular waveguides in the related technology is solved.

Finally, it is to be noted that the above embodiments are only intended to illustrate the technical solutions of the application, but not intended to limit the application. Although the application is described in detail with reference to the foregoing embodiments, it should be understood by those of ordinary skill in the art that: they may still make modifications to the technical solutions described in the foregoing embodiments or equivalent replacements to part or all of the technical features without any modification of the technical solutions or departures from the scope of the technical solutions of the embodiments of the application.

What is claimed is:

1. A waveguide layer, comprising: a flat plate sublayer, a first waveguide and a second waveguide intersected with the first waveguide, wherein the first waveguide and the second waveguide are both ridged waveguides; and the first waveguide and the second waveguide are arranged on the flat plate sublayer, and the flat plate sublayer, the first waveguide and the second waveguide are of an integrated structure;

wherein the first waveguide and the second waveguide are perpendicular to each other;

wherein the ridged waveguide comprises a wide strip section, two transition sections and two narrow strip sections;

the two transition sections and the two narrow strip sections are symmetrical about the wide strip section, the transition section is located between the narrow strip section and the wide strip section, the cross-sectional width of the wide strip section is greater than that of the narrow strip section, the width of one side, connected to the narrow strip section, of the transition section is equal to the cross-sectional width of the narrow strip section, and the width of one side, connected to the wide strip section, of the transition section is equal to the cross-sectional width of the wide strip section;

wherein in a cross-section parallel to the flat plate sublayer, the shapes of the narrow strip section and the wide strip section are both rectangular, and the width of the transition section gradually increases from the narrow strip section to the wide strip section;

wherein an angle between an outer surface of a strip edge of the ridged waveguide and the flat plate sublayer is greater than 20 degrees and less than 90 degrees.

2. The waveguide layer according to claim 1, wherein both ends of the first waveguide and both ends of the second waveguide extend to an edge of the flat plate sublayer.

3. The waveguide layer according to claim 1, wherein the first waveguide and the second waveguide are of the same structure.

4. A crossed waveguide, comprising an isolation layer, a substrate layer and the waveguide layer according to claim 1, wherein the isolation layer is arranged between the substrate layer and the waveguide layer, and a refractive index of the isolation layer is lower than that of the waveguide layer.

5. The crossed waveguide according to claim 4, further comprising a cover layer, wherein the waveguide layer is arranged between the isolation layer and the cover layer, a refractive index of the cover layer is lower than that of the waveguide layer, and the first waveguide and the second waveguide are located between the flat plate sublayer and the cover layer.

6. A photonic device, comprising the crossed waveguide according to claim 4.

7. A method for manufacturing a waveguide layer, comprising:

spin-coating a photoresist on a substrate;

performing pattern exposure on the substrate;

etching the substrate after pattern exposure to expose a flat plate sublayer, and a first waveguide and a second waveguide which protrude from the flat plate sublayer, wherein the first waveguide is intersected with the second waveguide, and the first waveguide and the second waveguide are both ridged waveguides; and removing the photoresist from the first waveguide and the second waveguide;

wherein the first waveguide and the second waveguide are perpendicular to each other;

wherein the ridged waveguide comprises a wide strip section, two transition sections and two narrow strip sections;

the two transition sections and the two narrow strip sections are symmetrical about the wide strip section, the transition section is located between the narrow strip section and the wide strip section, the cross-sectional width of the wide strip section is greater than that of the narrow strip section, the width of one side, connected to the narrow strip section, of the transition section is equal to the cross-sectional width of the narrow strip section, and the width of one side, connected to the wide strip section, of the transition section is equal to the cross-sectional width of the wide strip section;

wherein in a cross-section parallel to the flat plate sublayer, the shapes of the narrow strip section and the wide strip section are both rectangular, and the width of the transition section gradually increases from the narrow strip section to the wide strip section;

wherein an angle between an outer surface of a strip edge of the ridged waveguide and the flat plate sublayer is greater than 20 degrees and less than 90 degrees.

8. The method for manufacturing the waveguide layer according to claim 7, wherein both ends of the first waveguide and both ends of the second waveguide extend to an edge of the flat plate sublayer.

9. The method for manufacturing the waveguide layer according to claim 7, wherein the first waveguide and the second waveguide are of the same structure.

* * * * *